(12) United States Patent
Wiekert et al.

(10) Patent No.: US 6,882,867 B1
(45) Date of Patent: Apr. 19, 2005

(54) EXTRA CAPACITY RADIO BASE STATION FOR WIRELESS COMMUNICATION

(75) Inventors: Myrle K. Wiekert, Cumming, GA (US); Christopher Scott Erwin, Wesley Chapel, FL (US); Kraig A. Keys, Tampa, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 613 days.

(21) Appl. No.: 09/821,921

(22) Filed: Mar. 30, 2001

(51) Int. Cl.[7] .................................................. H04Q 7/30
(52) U.S. Cl. ...................... 455/561; 455/446; 455/448; 455/511
(58) Field of Search .............................. 455/422.1, 423, 455/424, 426, 446, 448, 63.4, 561, 562.1, 447, 453, 511

(56) References Cited

U.S. PATENT DOCUMENTS

| | | | | |
|---|---|---|---|---|
| 5,394,459 A | * | 2/1995 | Djuphammar et al. ... | 379/15.01 |
| 5,521,904 A | * | 5/1996 | Eriksson et al. ............ | 370/249 |
| 5,551,060 A | * | 8/1996 | Fujii et al. ................... | 455/447 |
| 5,898,683 A | * | 4/1999 | Matsumoto et al. ........ | 370/338 |
| 6,072,984 A | * | 6/2000 | Barringer .................... | 725/107 |
| 6,104,917 A | * | 8/2000 | Ketonen ...................... | 455/117 |
| 6,289,221 B1 | * | 9/2001 | Ritter .......................... | 455/447 |
| 6,411,825 B1 | * | 6/2002 | Csapo et al. ................ | 455/561 |

* cited by examiner

*Primary Examiner*—Nay Maung
*Assistant Examiner*—Philip J. Sobutka
(74) *Attorney, Agent, or Firm*—Cantor Colburn LLP

(57) ABSTRACT

An extra capacity radio base station for a wireless communication system. A first radio base station provides wireless communication to at least one sector of the wireless communication system. The first radio base station couples to a first group on n radios. A second radio base station couples to the first radio base station, and the second radio base station also provides wireless communication to the at least one sector. The second radio base station couples to a second group of n radios. The first radio base station coupled to the second radio base station creates the extra capacity radio base station. The extra capacity radio base station utilizes on extra control radio to create 2n+1 radios available for voice and data communication to the at least one sector of the wireless communication system.

26 Claims, 9 Drawing Sheets

"SECTOR A"

"SECTOR B"

"SECTOR C"

EXTRA CAPACITY RADIO BASE STATION FOR WIRELESS COMMUNICATION

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to wireless communications and, more particularly, to a radio base station design having expanded traffic capacity.

2. Description of the Related Art

Wireless communication has experienced explosive growth. In just a few years cellular telephone usage has soared, and growth continues as wireless Internet access improves. This explosive growth has revolutionized data and voice communication, and manufacturers are continually striving to improve wireless equipment to meet the explosive growth.

Radio base stations are one example of continuously improving wireless equipment. Radio base stations are self-contained enclosures that house transmitters, receivers, and other wireless communication equipment. These radio base stations are then installed to provide the best coverage with the least interference.

Radio base stations, however, often limit expansion. As demand for wireless service increases, this demand may exceed the traffic capacity of the radio base station. A 3×7 radio base station, for example, serves three (3) cells, or sectors, with seven (7) radios per sector. As more and more wireless customers are added to the network, the capacity of the 3×7 radio base station is exceeded. If wireless service providers want to match the demand for wireless service, the wireless service provider must increase the capacity of the radio base station.

Increasing the capacity of a radio base station, however, is a huge effort. Any redesign of the radio base station often requires thousands of hours and hundreds of peoples. Many engineers are required to design the new base station. Testing personnel spend hundreds of hours testing the new design and ensuring government regulations are achieved. Manufacturing engineers must design new tooling and processes to produce the new design. Many other people are simultaneously involved in marketing and selling the new radio base station design. These redesign efforts, therefore, may require months, or even years, of effort.

Once the redesigned radio base station is available, the new design is expensive. A single radio base station, for example, may cost $350,000 to $400,000. Because a wireless network often includes one hundred (100) or more radio base stations, upgrading the capacity of the entire network may cost tens, or even hundreds, of millions of dollars. If wireless service providers, therefore, need to increase the capacity of their radio base stations, this upgrade in capacity is a long and expensive process.

There is, accordingly, a need in the art for a radio base station design that is easily upgraded to larger capacities, a radio base station design that may be quickly upgraded to meet demand, and, yet, a radio base station design that can resolve the prior art problems without large capital outlays.

BRIEF SUMMARY OF THE INVENTION

The aforementioned problems are minimized by coupling together existing radio base designs. Instead of redesigning a radio base station to meet capacity, the present invention couples together two, or more, existing radio base stations. A first radio base station, for example, is connected to a second radio base station. The two radio base stations effectively operate as a single radio base station with more than double the capacity.

The present invention is quickly implemented. Because the present invention couples together two, or more, existing radio base station designs, engineers may quickly increase capacity to handle more wireless customers. Existing, commercially available radio base stations are coupled together for a fast resolution to capacity concerns. The present invention does not require months, or even years, of effort before capacity equals demand.

The present invention is also much less expensive. A wireless service provider may spend tens or hundreds of millions of dollars acquiring a new radio base station design. The present invention, however, couples together readily-available, production radio base stations. These readily-available, production radio base stations are less expensive than a new design. The present invention also allows a wireless service provider to reuse older equipment to meet increasing demand. Whereas older radio base stations may be scrapped or sold for a fraction of their purchase price, the present invention shows older equipment may be coupled together to meet growing demand. The present invention thus provides a less expensive alternative when expanding wireless capacity.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
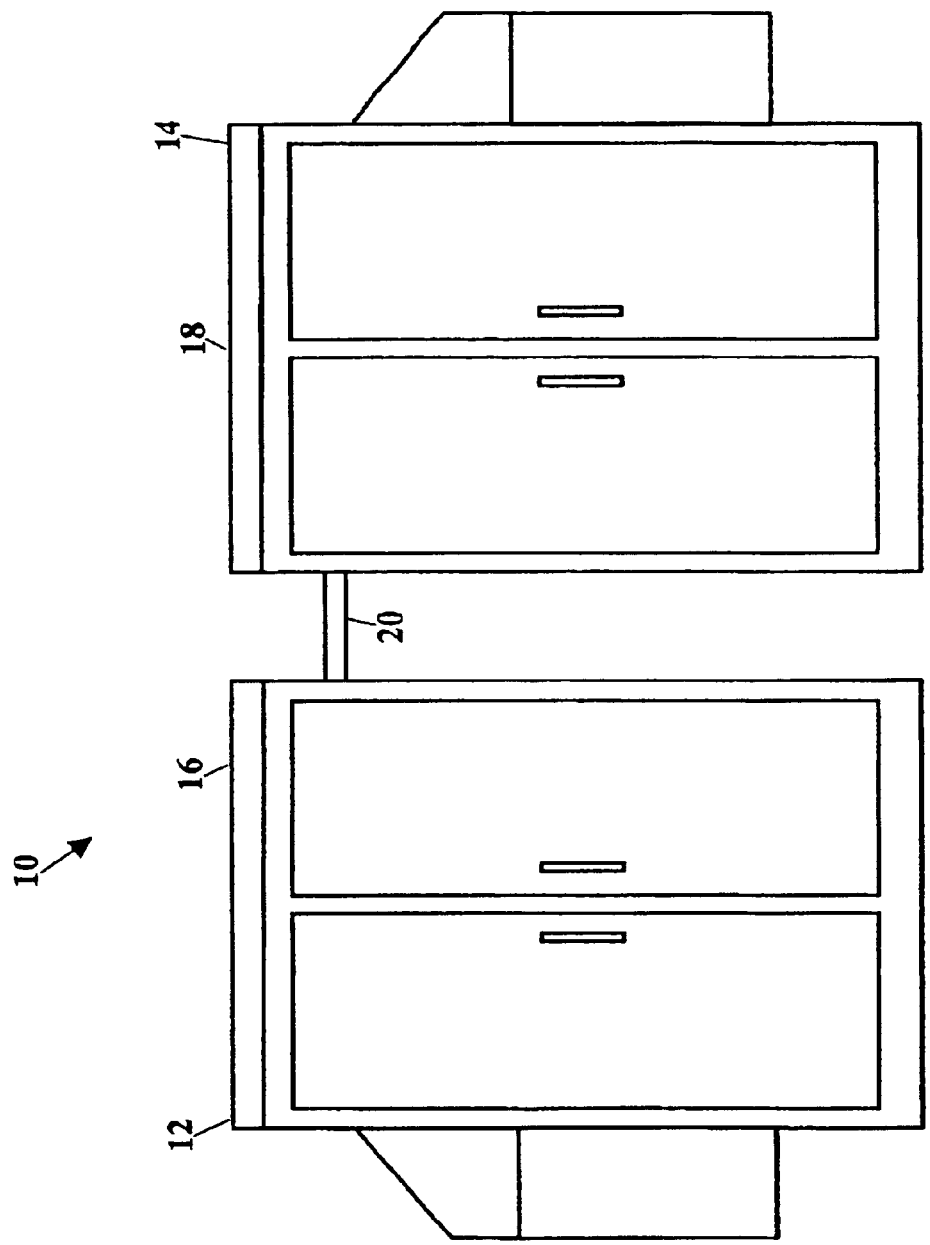
FIG. 1 is a schematic drawing showing one embodiment of an extra capacity radio base station.

The present invention is an extra capacity radio base station for a wireless communication system. A first radio base station provides wireless communication to at least one sector of the wireless communication system. The first radio base station couples to a first group of n radios, where n is an integer. A second radio base station couples to the first radio base station, and the second radio base station also provides wireless communication to the at least one sector. The second radio base station couples to a second group of n radios. The first radio base station coupled to the second radio base station creates the extra capacity radio base station. The extra capacity radio base station utilizes an extra control radio to create 2n+1 radios available for voice and data communication to the at least one sector of the wireless communication system.

Another embodiment describes a 3×15 radio base station for a wireless communication system. The 3×15 radio base station couples together two (2) 3×7 radio base stations to create the 3×15 radio base station. A first 3×7 radio base station and a second 3×7 radio base station provides wireless communication to three sectors of the wireless communication system. The first 3×7 radio base station couples to a first group of seven radios per each sector of the three sectors, and the second 3×7 radio base station couples to a second group of seven radios per each sector of the three sectors. Although the first and the second 3×7 radio base station each have an extra eighth radio for control signals, the 3×15 radio base station only needs one radio for control. The 3×15 radio base station, therefore, may utilize all eight radios in the first radio base station for voice communication, while only seven radios in the second radio base station are used for voice communication. The extra eighth radio in the second radio base station is used for control signals. Thus one radio controls coupled-together first and the second 3×7 radio base station. The first 3×7 radio base station coupled to the second 3×7 radio base station creates the 3×15 radio base station, with the 3×15 radio base station providing the three sectors with fifteen radios per each sector.

An alternative embodiment is also disclosed. This alternate embodiment also describes a 3×15 radio base station for a wireless communication system. This alternate embodiment also has a first 3×7 radio base station and a second 3×7 radio base station. The first 3×7 radio base station and the second 3×7 radio base station each provide wireless communication to three sectors within the wireless communication system. The first 3×7 radio base station comprises a first group of seven radios per sector, a first measuring coupler unit, and a first power splitter unit. The first measuring coupler unit amplifies and splits received signals, and the first power splitter unit distributes received signals. The second 3×7 radio base station couples to the first 3×7 radio base station. The second radio base station comprises a second group of seven radios per sector, a second measuring coupler unit, and a second power splitter unit. The second measuring coupler unit also amplifies and splits received signals, and the second power splitter unit also distributes received signals. The first 3×7 radio base station coupled to the second 3×7 radio base station creates the 3×15 radio base station, with the 3×15 radio base station providing the three sectors with fifteen radios per each sector.

Still a further embodiment is disclosed. This embodiment has a first 3×7 radio base station and a second 3×7 radio base station. The first 3×7 radio base station and the second 3×7 radio base station each provide wireless communication to three sectors within the wireless communication system. The first 3×7 radio base station comprises a first group of seven radios per sector, a first measuring coupler unit, a first power splitter unit, and a first radio frequency test loop. The first measuring coupler unit amplifies and splits received signals, the first power splitter unit distributes received signals, and the first radio frequency test loop allows calibration and test of the first 3×7 radio base station. The second radio base station comprises a second group of seven radios per sector, a second measuring coupler unit, a second power splitter unit, and a second radio frequency test loop. The second measuring coupler unit also amplifies and splits received signals, the second power splitter unit also distributes received signals, and the second radio frequency test loop permits calibration and test of the second 3×7 radio base station. The first measuring coupler unit couples to the first power splitter unit and to the second power splitter unit. The first radio frequency test loop couples to the first measuring coupler unit and to the second measuring coupler unit. The second measuring coupler unit couples to the second power splitter unit and to the first power splitter unit. The second radio frequency test loop couples to the second measuring coupler unit and to the first measuring coupler unit. The first 3×7 radio base station coupled to the second 3×7 radio base station creates the 3×15 radio base station, with the 3×15 radio base station providing the three sectors with fifteen radios per each sector. The 3×15 radio base station transmits and receives frequencies in at least one range of 806–960 MHz, 1710–1855 MHz, 2500–2690 MHz, and 2.4 GHz–2.5 GHz.

Figure 2:
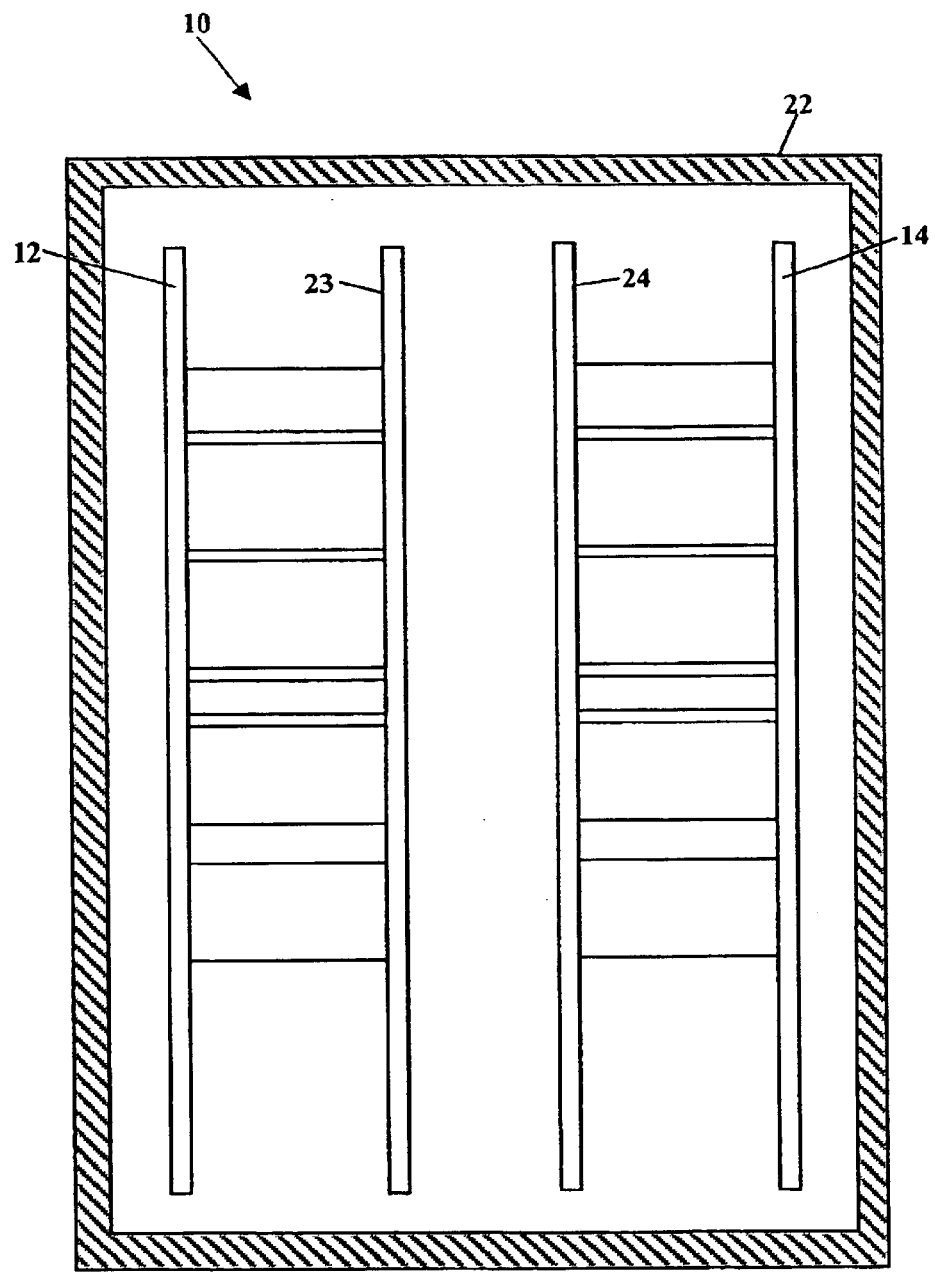
FIG. 2 is a schematic drawing showing another embodiment of the extra capacity radio base station.

FIGS. 1 and 2 are schematic drawings showing embodiments of an extra capacity radio base station 10. The extra capacity radio base station 10 is created by coupling together a first radio base station 12 and a second radio base station 14. FIG. 1 shows the extra capacity radio base station 10 may include separate cabinets. The first radio base station 12 is housed in a first cabinet 16, while the second radio base station 14 is housed in a separate second cabinet 18. A conduit 20 connects the first cabinet 16 with the second cabinet 18. The conduit 20 provides a protected passage for cables and wires (not shown for simplicity) coupling the first radio base station 12 with the second radio base station 14. The first radio base station 12 and the second radio base station 14 are shown as the Ericsson® RBS 884 family of Time Division Multiple Access products (Ericsson® is a registered trademark of Telefonaktiebolaget LM Ericssonhouses, Telefonvägen 30, 12625 Stockholm, Sweden, phone: +46 8 719 00 00. Those of ordinary skill in the art of wireless communication understand, however, that the Ericsson® 884 family is only a representative example of radio base stations, and that the present invention is equally applicable to other radio base station designs and other radio base station manufacturers.

FIG. 2 is a sectional view of an alternative embodiment of the extra capacity radio base station 10. Here the extra capacity radio base station 10 includes a prefabricated structure 22. The first radio base station 12 is shown as a first rack 23 of wireless communication equipment, while the second radio base station 14 is shown as an adjacent second rack 24 of wireless communication equipment. The first rack 23 and the second rack 24 are housed within the prefabricated structure 22. The first rack 23 and the second rack 24 are coupled together, as FIGS. 3–9 will show, to create the extra capacity radio base station 10.

FIGS. 3–6 are schematic drawings showing coupling arrangements between the first radio base station 12 and the second radio base station 14. These coupling arrangements create the extra capacity radio base station (shown as reference numeral 10 in FIGS. 1 and 2) from the first 12 and the second 14 radio base station. An example of the extra capacity radio base station is shown by coupling together two 3×7 radio base stations. The first radio base station 12, and the second radio base station 14, are each shown as a 3×7 configuration. Once the coupling arrangements shown in FIGS. 3–6 are completed, the extra capacity radio base station, having a 3×15 configuration, is created from the first 3×7 radio base station 12 and the second 3×7 radio base station 14.

Figure 3:
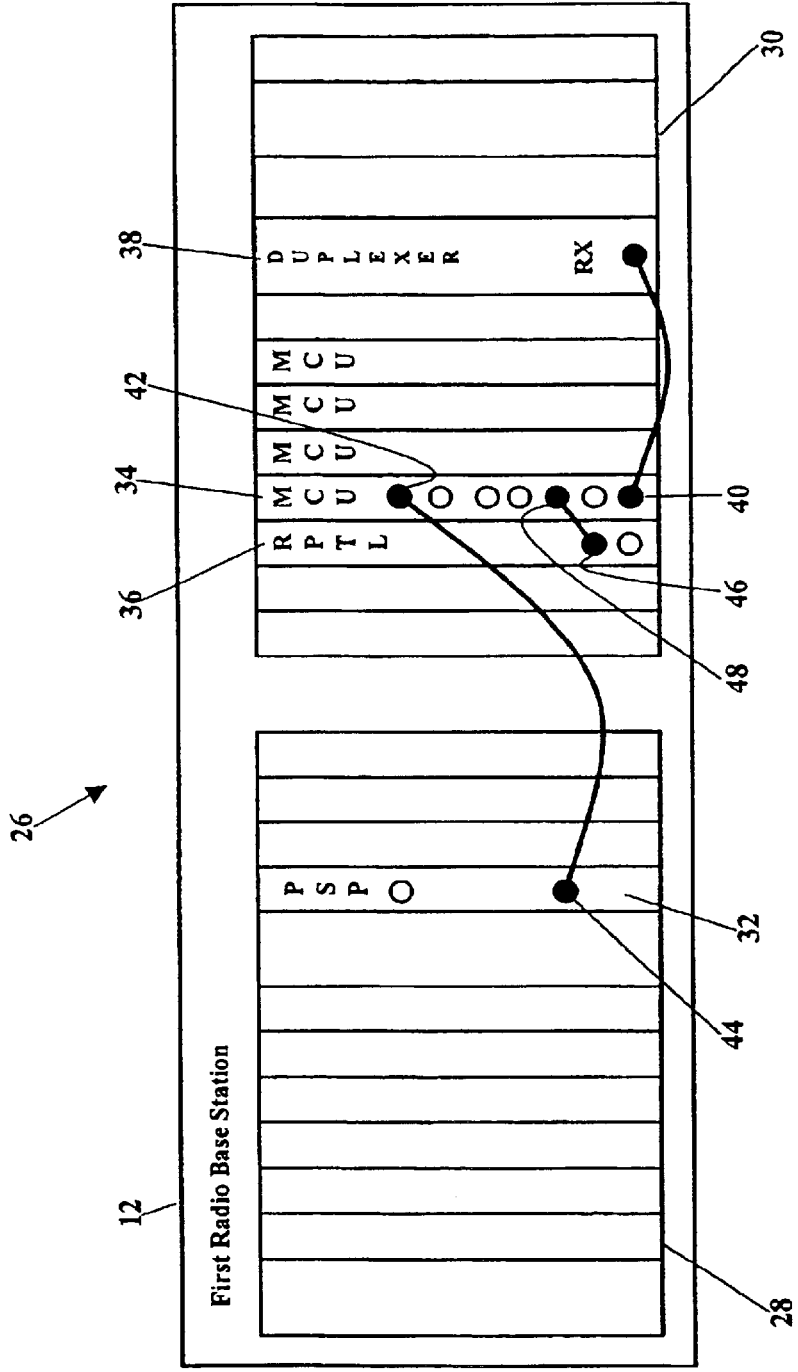
FIGS. 3–6 are schematic drawings showing coupling arrangements between a first 3×7 radio base station and a second 3×7 radio base station.

FIG. 3 shows a first internal coupling arrangement 26 within the first 3×7 radio base station 12. The first 3×7 radio base station 12 has a first transceiver cabinet 28 and a first antenna near part cabinet 30. The first transceiver cabinet 28 has a first power splitter unit (PSP) 32. The first antenna near part cabinet 30 includes a first measuring coupler unit (MCU) 34, a first radio frequency test loop (RFTL) 36, and a first duplexer 38. The first power splitter unit 32 distributes received signals, the first measuring coupler unit 34 amplifies and splits received signals, and the first radio frequency test loop 36 allows calibration and test of the first 3×7 radio base station 12. The first measuring coupler unit 34 has an input 40 receiving signals from the first duplexer 38. As FIG. 3 shows, the first measuring coupler unit 34 couples to the first power splitter 32 and to the first radio frequency test loop 36. The first measuring coupler unit 34 has a first output 42 coupled to a first multicoupler branch 44 of the first power splitter 32. The first radio frequency test loop 36 has a first output 46 coupled to a first input 48 on the first measuring coupler unit 34.

Figure 4:
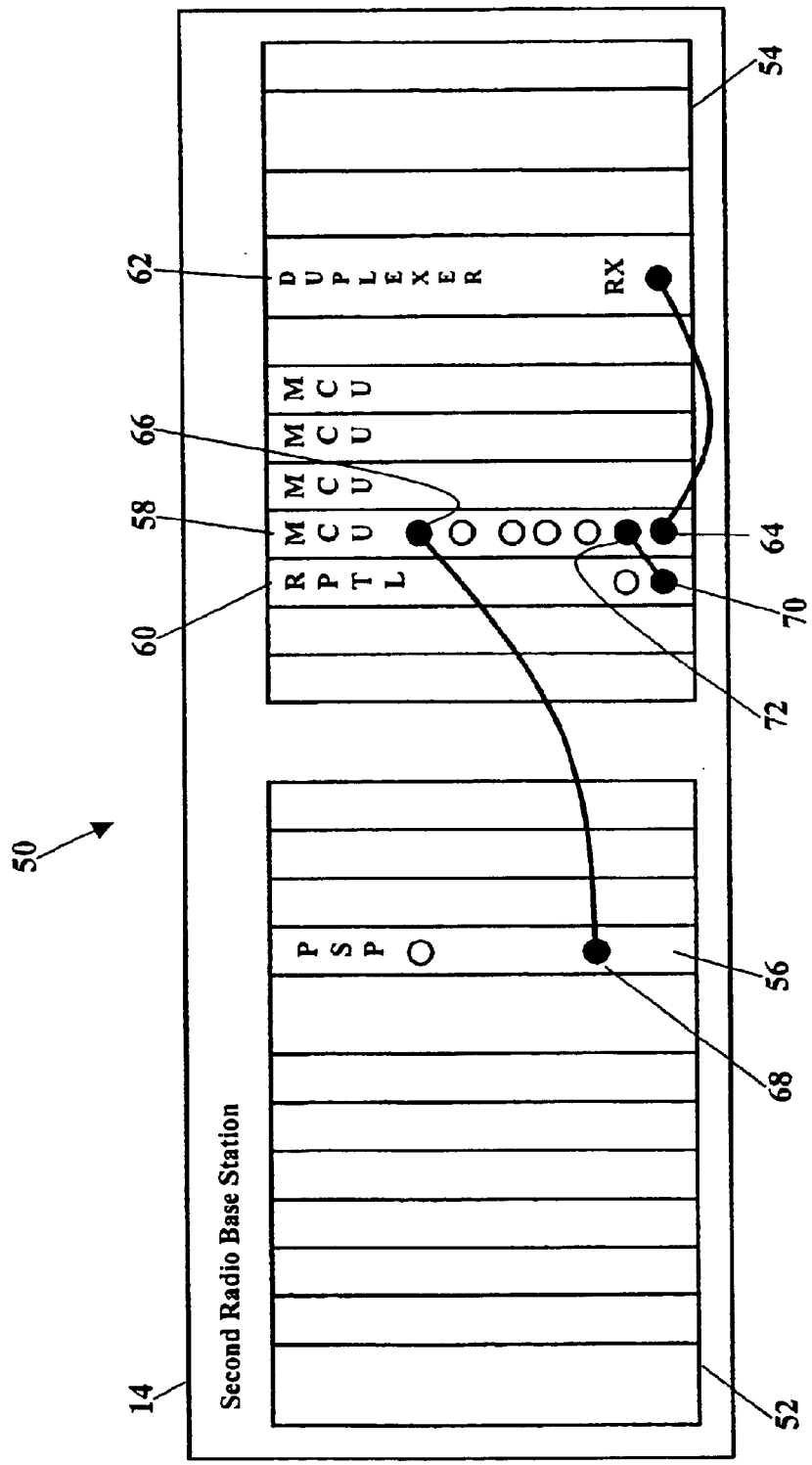

FIG. 4 shows a second internal coupling arrangement 50 within the second 3×7 radio base station 14. The second 3×7 radio base station 14, likewise, has a second transceiver cabinet 52 and a second antenna near part cabinet 54. The second transceiver cabinet 52 has a second power splitter unit (PSP) 56. The second antenna near part cabinet 54 includes a second measuring coupler unit (MCU) 58, a second radio frequency test loop (RFTL) 60, and a second duplexer 62. The second measuring coupler unit 58 has an input 64 receiving signals from the second duplexer 62. As FIG. 4 shows, the second measuring coupler unit 58 couples to the second power splitter 56 and to the second radio frequency test loop 60. The second measuring coupler unit 58 has a first output 66 coupled to a second multicoupler branch 68 of the second power splitter 56. The second radio frequency test loop 60 has a second output 70 coupled to a first input 72 on the second measuring coupler unit 58.

Figure 5:
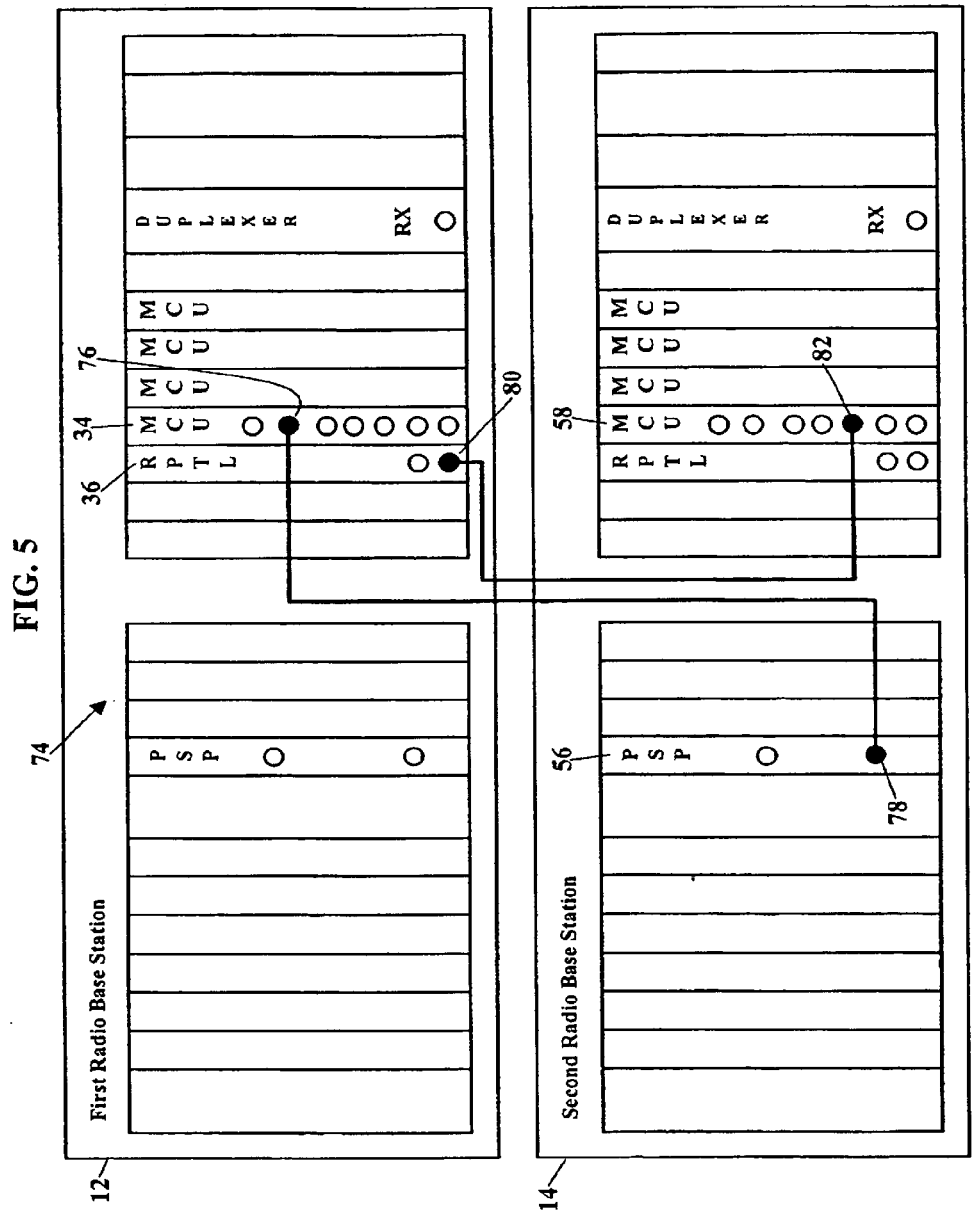

FIG. 5 shows a third internal coupling arrangement 74. The third internal coupling arrangement 74 couples the first 3×7 radio base station 12 to the second 3×7 radio base station 14. As FIG. 5 shows, the first measuring coupler unit 34 also couples to the second power splitter unit 56, and the first radio frequency test loop 36 couples to the second measuring coupler unit 58. The first measuring coupler unit 34 has a second output 76 coupled to a first multicoupler branch 78 of the second power splitter 56. The first radio frequency test loop 36 has a second output 80 coupled to a second input 82 on the second measuring coupler unit 58.

Figure 6:
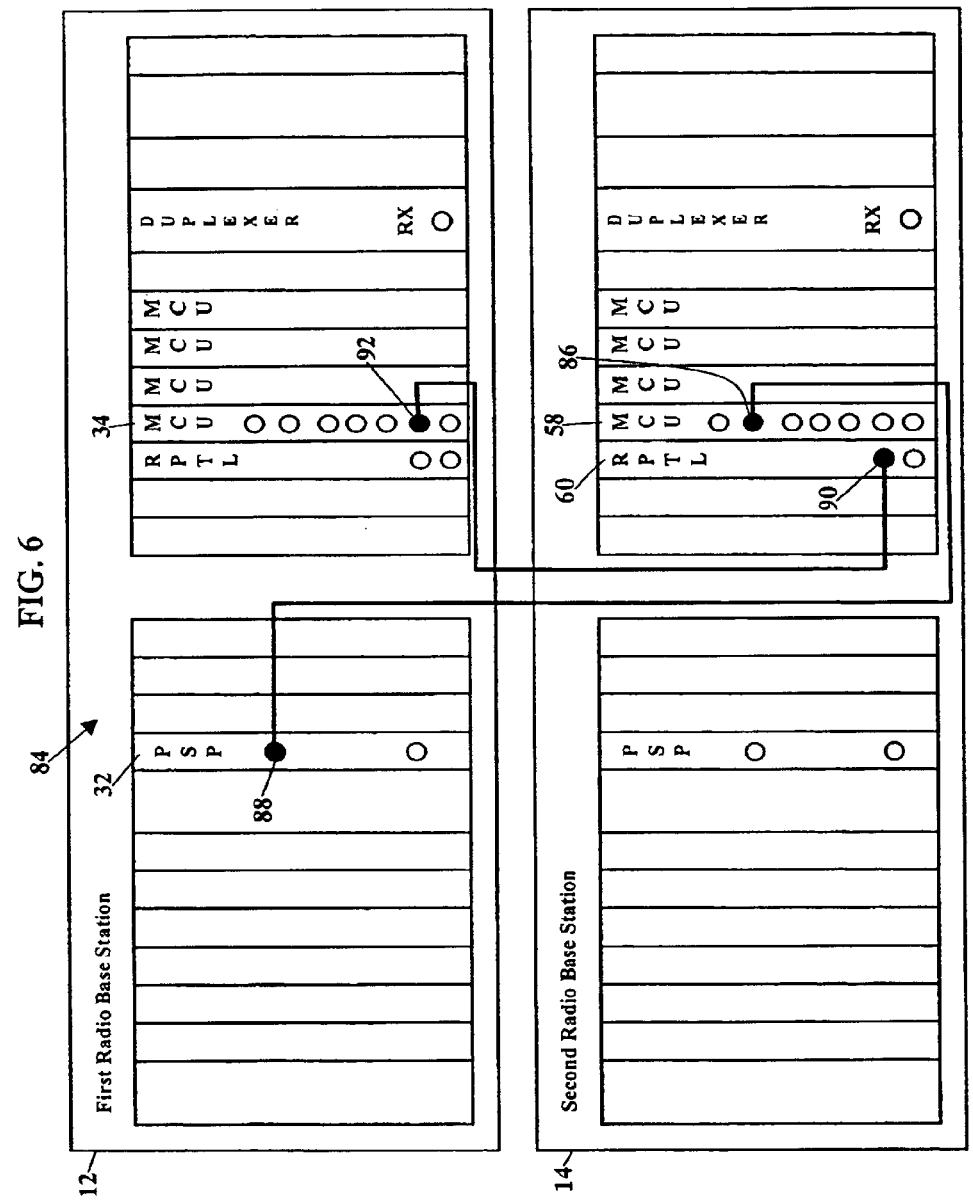

FIG. 6 shows a fourth internal coupling arrangement 84. The fourth internal coupling arrangement 84 continues to couple the first 3×7 radio base station 12 to the second 3×7 radio base station 14. As FIG. 6 shows, the second measuring coupler unit 58 also couples to the first power splitter unit 32, and the second radio frequency test loop 60 couples to the first measuring coupler unit 34. The second measuring coupler unit 58 has a second output 86 coupled to a second multicoupler branch 88 of the first power splitter 32. The second radio frequency test loop 60 has a first output 90 coupled to a second input 92 on the first measuring coupler unit 34.

The table shown below lists these coupling arrangements. Once the coupling arrangements (shown as reference numerals 26, 50, 74, 84 in FIGS. 3–6) are complete, the extra capacity radio base station, having the 3×15 configuration, is created. The extra capacity radio base station (shown as reference numeral 10 in FIGS. 1 and 2) provides wireless communication to three sectors of a wireless communication system. The coupling arrangements shown in the table below, and shown in FIGS. 3–6, are for one sector. These coupling arrangements would be duplicated for each other sector.

| FROM | | TO | |
|---|---|---|---|
| Cabinet | Jack | Cabinet | Jack |
| A | MCA | A | MC OUT 1 |
| A | MCB | B | MC OUT 2 |
| A | RFTL OUT A | A | RFTL |
| A | RFTL OUT B | B | RFTL |
| A | MC OUT 2 | B | MCA |
| A | MC INPUT | A | DUPLEXER RX |
| B | MCA | A | MC OUT 2 |
| B | MCB | B | MC OUT 1 |
| B | RFTL OUT A | A | RFTL |
| B | RFTL OUT B | B | RFTL |
| B | MC OUT 2 | A | MCB |
| B | MC INPUT | B | DUPLEXER RX |

Because these coupling arrangements are duplicated for each sector, there remains some unused componentry. The coupling arrangements shown in the above table, and in FIGS. 3–6, provide an extra six (6) duplexers and an extra six (6) MC cards. These boards, if desired, may be removed and used elsewhere.

The extra capacity radio base station (shown as reference numeral 10 in FIGS. 1 and 2), with the 3×15 configuration, provides wireless communication to three sectors of a wireless communication system. The first 3×7 radio base station (shown as reference numeral 12 in FIGS. 1 and 2) couples to a first group of seven radios per each sector of the three sectors. The second 3×7 radio base station (shown as reference numeral 14 in FIGS. 1 and 2) couples to a second group of seven radios per each sector of the three sectors. Although the first and the second 3×7 radio base station each have an extra radio for control signals, the 3×15 radio base station only needs one radio for control. The extra control radio may then be used for voice traffic, thus creating a fifteenth voice radio. The first 3×7 radio base station coupled to the second 3×7 radio base station creates the 3×15 radio base station, with the 3×15 radio base station providing the three sectors with fifteen radios per each sector.

Figure 7:
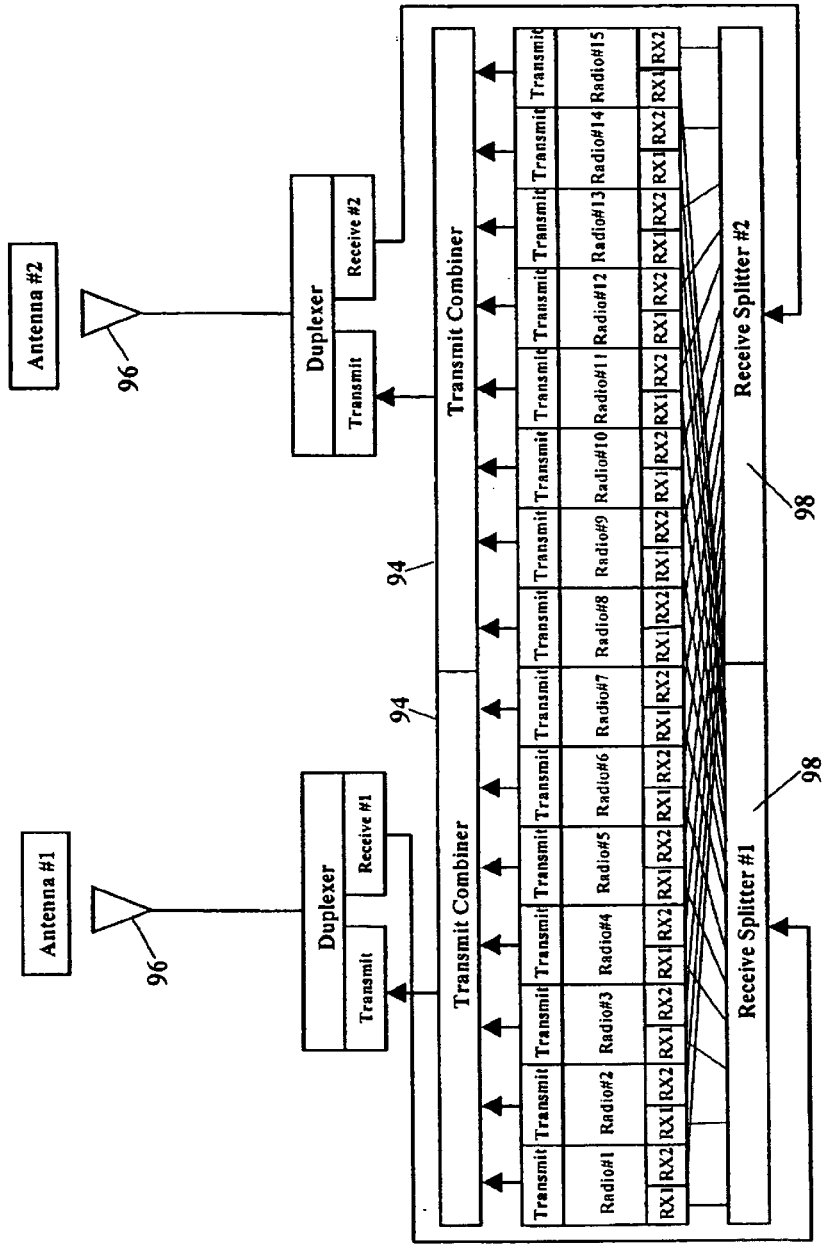
FIGS. 7–9 are schematic drawings showing radio configurations of a 3×15 radio base station.
Figure 8:
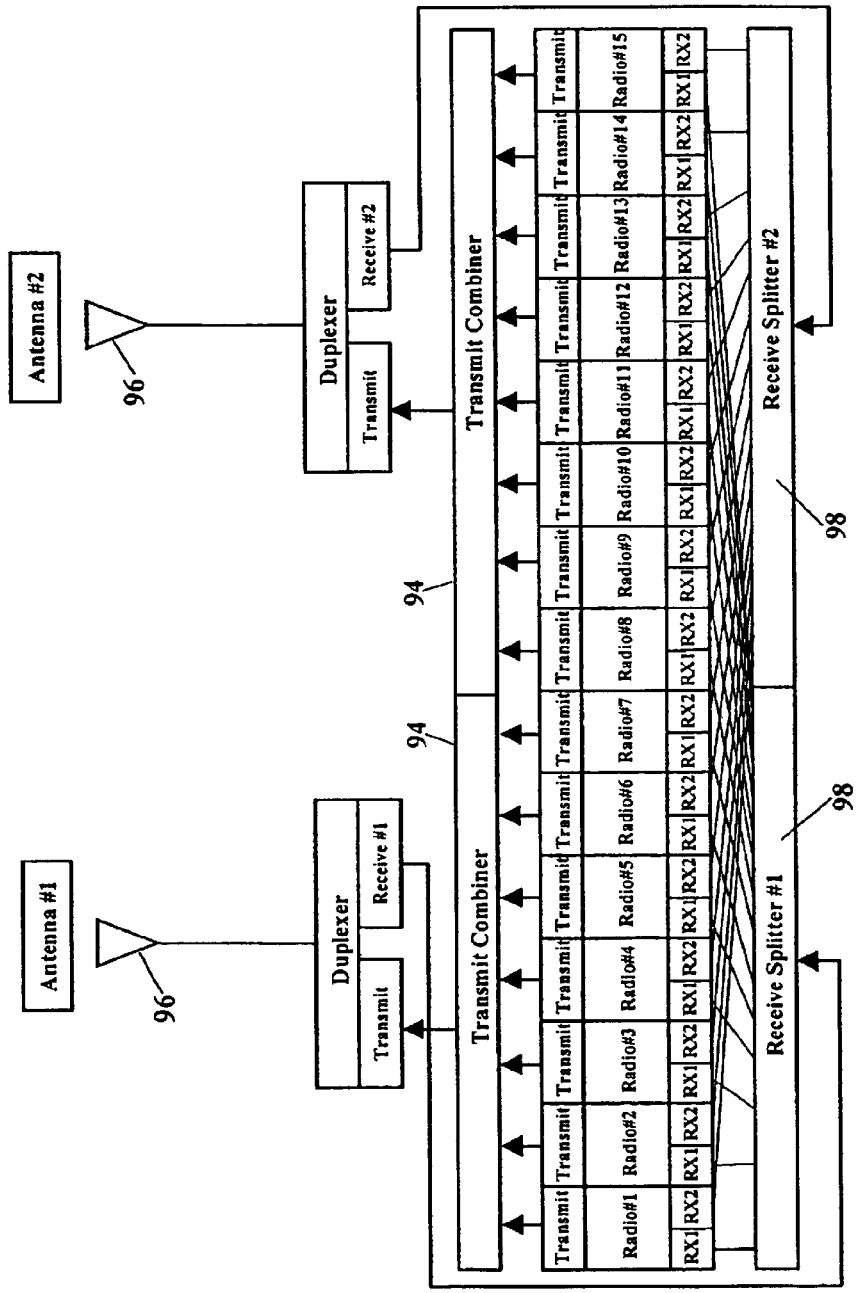
Figure 9:
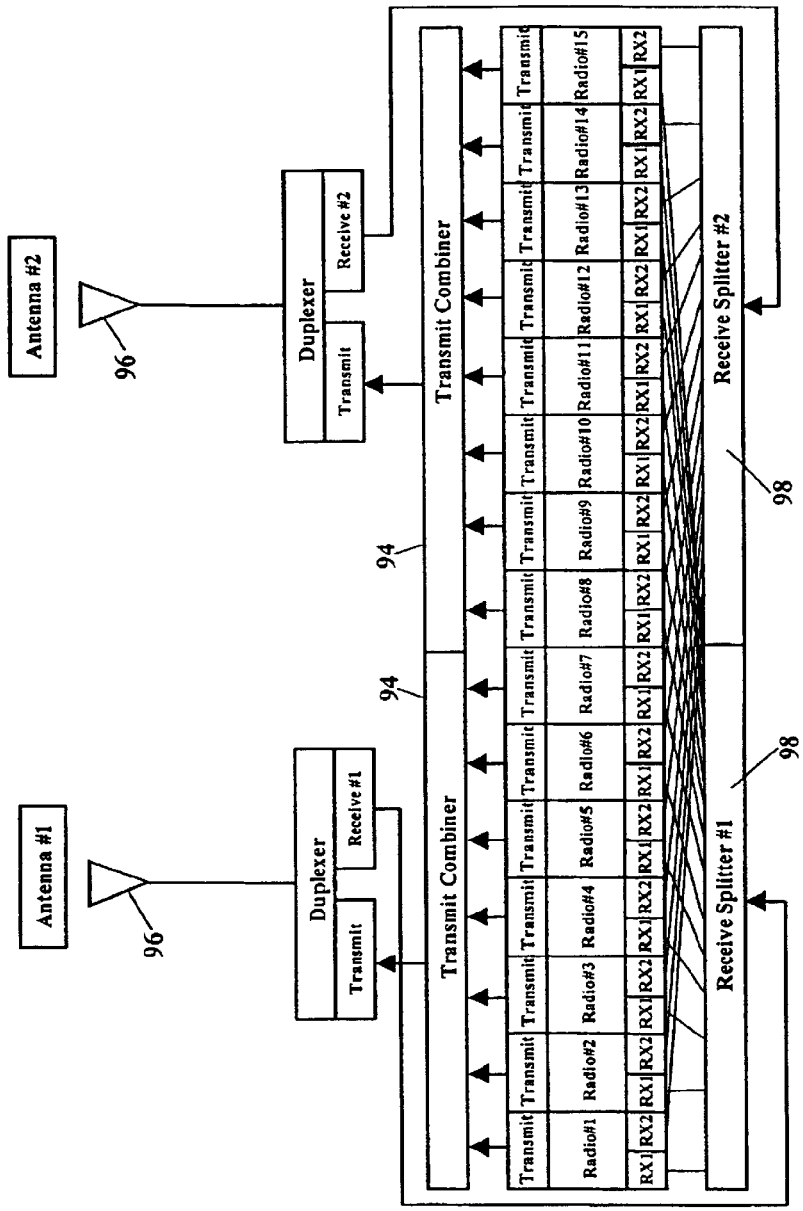

FIGS. 7–9 are schematic drawings showing radio configurations of the extra capacity radio base station (shown as reference numeral 10 in FIGS. 1 and 2). Multiple transmitter output signals are merged by a combiner 94 and radiated by an antenna 96. The antenna 96 receives multiple signals and a splitter 98 splits the multiple signals for each respective radio receiver. FIG. 7 shows a configuration for a first sector "A," while FIGS. 8 and 9 show, respectively, a configuration for a second sector "B" and a third sector "C." An extra control radio is then used for voice traffic, thus creating a fifteenth voice radio.

The extra capacity radio base station operates as a single cell site. Although the extra capacity radio base station couples together two base stations, the extra capacity radio base station has a single cell site number and a single set of antennas. The extra capacity radio base station simply requires the installation of an extra cabinet or, for prefabricated structures, extra equipment. The coupling arrangements shown in FIGS. 3–6 also maintain a balanced signal strength for diversity.

Those of ordinary skill in the art now recognize an extra capacity radio base station may be created from various configurations. If, for example, the first radio base station (shown as reference numeral 12 in FIGS. 1–3 and 5–6) is a 2×11, and the second radio base station (shown as reference numeral 14 in FIGS. 1–2 and 4–6) is a 2×11, the extra capacity radio base station would have a configuration of 2×23. Coupling two 1×7 radio base stations would produce a 1×15 extra capacity radio base station. The extra capacity radio base station more than doubles capacity by converting an extra control radio for voice/data traffic. If the first radio base station and the second radio base station each couple to a group of n radios, where n is an integer, the extra capacity radio base station thus creates 2n+1 voice/data radios. The 2n+1 voice/data radios may be used to increase the capacity of voice and data traffic.

Those of ordinary skill in the art of wireless communication also recognizes the present invention is applicable to all wireless communication methods. The present invention is applicable to radio base stations utilizing code-division multiple access (CDMA) technologies, time-division multiple access (TDMA) technologies, and the global system for mobile communications (GSM) technology. The present invention is also compatible with the June, 2000 World Radiocommunication Conference agreement on third-generation cellular telephony (806–960 MHz, 1710–1885 MHz, and 2500–2690 MHz). See William Sweet, *Cell phones answer Internet's call,* IEEE SPECTRUM, August 2000. Radio base stations transmitting and receiving radio frequencies, such as the industrial, scientific, and medical (ISM) band of the electromagnetic spectrum (2.4 GHz–2.5 GHz), (e.g., "Bluetooth"), are also applicable.

While this invention has been described with respect to various features, aspects, and embodiments, those skilled and unskilled in the art will recognize the invention is not so limited. Other variations, modifications, and alternative embodiments may be made without departing from the spirit and scope of the following claims.

What is claimed is:

1. An extra capacity radio base station for a wireless communication system, comprising:
    a first radio base station providing wireless communication to at least one sector of the wireless communication system, the first radio base station coupled to a first group of n radios, where n is an integer, the first group of n radios transmitting and receiving frequencies in at least one range of 806–960 MHz, 1710–1855 MHz, 2500–2690 MHz, and 2.4 GHz–2.5 GHz; and
    a second radio base station coupled to the first radio base station, the second radio base station also providing wireless communication to the at least one sector, the second radio base station coupled to a second group of n radios, the second group of n radios also transmitting and receiving frequencies in at least one range of 806–960 MHz, 1710–1855 MHz, 2500–2690 MHz, and 2.4 GHz–2.5 GHZ,
    wherein the firs radio base station coupled to the second radio base station creates the extra capacity radio base station, the extra capacity radio base station utilizing an extra control radio for voice or data communication to create 2n+1 radios available for voice or data communication and one control radio for control signals to the at least one sector of the wireless communication system.

2. The extra capacity radio base station of claim 1 wherein:
    said first radio base station and said second radio base station are housed within a common structure.

3. The extra capacity radio base station of claim 1 wherein:
    said first radio base station is coupled to said second radio base station by cabling connecting said first radio base station to said second radio base station.

4. The extra capacity radio base station of claim 3 wherein:
    said first radio base station is housed in a first cabinet, said second radio base station is housed in a second cabinet, and a conduit between said first cabinet and said second cabinet contains said cabling.

5. A 3×15 radio base station for a wireless communication system, comprising:
    a first 3×7 radio base station providing wireless communication to the three sectors of the wireless communication system, the first 3×7 radio base station coupled to a first group of seven radios per each sector of the three sectors; and
    a second 3×7 radio base station coupled to the 3×7 radio base station, the second 3×7 radio base station also providing wireless communication to the three sectors, the second 3×7 radio base station coupled to a second group of seven radios per each sector of the three sectors,
    wherein the first 3×7 radio base station coupled to the second 3×7 radio base station creates the 3×15 radio base station utilizing 14 radios and an extra control radio for voice or data communication and one control radio for control signals, the 3×15 radio base station providing the three sectors with fifteen radios per each sector.

6. A 3×15 radio base station according to claim 5, wherein the 3×15 radio base station transmits and receives frequencies between 806–960 MHz.

7. A 3×15 radio base station according to claim 5, wherein the 2×15 radio base station transmits and receives frequencies between 1710–1855 MHz.

8. A 3×15 radio base station according to claim 5, wherein the 3×15 radio base station transmits and receives frequencies between 2500–2690 MHz.

9. A 3×15 radio base station according to claim 5, wherein the 3×15 radio base station transmits and receives frequencies between 2.4 GHz–2.5 GHz.

10. A 3×15 radio base station according to claim 5, wherein the first 3×7 radio base station comprises a cabinet to protect electronic equipment from environmental exposure.

11. A 3×15 radio base station according to claim 5, wherein the second 3×7 radio base station comprises a cabinet to protect electronic equipment from environmental exposure.

12. A 3×15 radio base station according to claim 5, wherein the first 3×7 radio base station comprises a prefabricated structure.

13. A 3×15 radio base station according to claim 5, wherein the second 3×7 radio base station comprises a prefabricated structure.

14. The 3×15 radio base station of claim 5 wherein:
    said first 3×7 radio base station and said second 3×7 radio base station are housed within a common structure.

15. The 3×15 radio base station of claim 5 wherein:
    said first 3×7 radio base station is coupled to said second 3×7 radio base station by cabling connecting said first 3×7 radio base station to said second 3×7 radio base station.

16. The 3×15 radio base station of claim 15 wherein:
    said first 3×7 radio base station is housed in a first cabinet, said second 3×7 radio base station is housed in a second cabinet, and a conduit between said first cabinet and said second cabinet contains said cabling.

17. A 3×15 radio base station for a wireless communication system, comprising:

a first 3×7 radio base station providing wireless communication to three sectors of the wireless communication system, the first 3×7 radio base station coupled to a first group of seven radios per each sector of the three sectors, the first group of seven radios transmitting and receiving frequencies in at least one range of 806–960 MHz, 1710–1855 MHz, 2500–2690 MHz, and 2.4 GHz–2.5 GHz; and a second 3×7 radio base station coupled to the first 3×7 radio base station, the second 3×7 radio base station also providing wireless communications to the three sectors, the second 3×7 radio base station coupled to a second group of seven radios per each sector of the three sectors, the second group of seven radios transmitting and receiving frequencies in at least one range of 806–960 MHz, 1710–1855 MHz, 2500–2690 MHz, and 2.4 GHz–2.5 GHz, wherein the first 3×7 radio base station coupled to the second 3×7 radio base station creates the 3×15 radio base station utilizing 14 radios and an extra control radio for voice or data communication and one control radio for control signals, the 3×15 radio base station providing the three sectors with fifteen radios per each sector.

18. A 3×15 radio base station for a wireless communication system, comprising:

a first 3×7 radio base station and a second 3×7 radio base station, the first 3×7 radio base station and the second 3×7 radio base station each providing wireless communication to three sectors within the wireless communication system;

the first 3×7 radio base station comprising a first group of seven radios per sector, a first measuring coupler unit, and a first power splitter unit, the first measuring coupler unit for amplifying and splitting received signals, and the first power splitter unit for distributing received signals; and the second 3×7 radio base station coupled to the first 3×7 radio base station, the second radio base station comprising a second group of seven radios per sector, a second measuring coupler unit, and second power splitter unit, the second measuring coupler unit also for amplifying and splitting received signals, the second power splitter unit also for distributing received signals, wherein the first 3×7 radio base station coupled to the second 3×7 radio base station creates the 3×15 radio base station utilizing 14 radios and an extra control radio for voice or data communication and one control radio for control signals, the 3×15 radio base station providing the three sectors within fifteen radios per each sector.

19. A 3×15 radio base station according to claim 18, wherein the first measuring coupler unit is coupled to the second power splitter unit.

20. A 3×15 radio base station according to claim 18, wherein the second measuring coupler unit is coupled to the first power splitter unit.

21. A 3×15 radio base station according to claim 18, wherein the first measuring coupler unit is coupled to the first power splitter unit and to the second power splitter unit.

22. A 3×15 radio base station according to claim 18, wherein the second measuring coupler unit is coupled to the second power splitter unit and to the first power splitter unit.

23. A 3×15 radio base station according to claim 18, wherein the first 3×7 radio base station further comprises a first radio frequency test loop, the first radio frequency test loop coupled to the first measuring coupler unit and to the second measuring coupler unit.

24. A 3×15 radio base station according to claim 18, wherein the second 3×7 radio base station further comprises a second radio frequency test loop, the second radio frequency test loop coupled to the second measuring coupler unit and to the first measuring coupler unit.

25. A 3×15 radio base station according to claim 18, wherein the 3×15 radio base station transmits and receives frequencies in at least one range of 806–960 MHz, 1710–1855 MHz, 2500–2690 MHz, and 2.4 GHz–2.5 GHz.

26. A 3×15 radio base station for a wireless communication system, comprising:

a first 3×7 radio base station and a second 3×7 radio base station, the first 3×7 radio base and the second 3×7 radio base station each providing wireless communication to three sectors within the wireless communication system;

the first 3×7 radio base station comprising a first group of seven radios per sector, a first measuring coupler unit, a first power splitter unit, and first radio frequency test loop, the first measuring coupler unit for amplifying and splitting received signals, the first power splitter unit for distributing received signals, and the first radio frequency test loop for calibration and test of the first 3×7 radio base station;

the second radio base station comprising a second group of seven radios per sector, a second measuring coupler unit, a second power splitter unit, and a second radio frequency test loop, the second measuring coupler unit also for amplifying and splitting received signals, the second power splitter unit also for distributing received signals, and the second radio frequency test loop for calibration and test of the second 3×7 radio base station;

the first measuring coupler unit coupled to the first power splitter unit and to the second power splitter unit, the first radio frequency test loop coupled to the first measuring coupler unit and to the second measuring coupler unit; and the second measuring coupler unit coupled to the second power splitter unit and to the first power splitter unit, the second radio frequency test loop coupled to the second measuring coupler unit and to the first measuring coupler unit, wherein the first 3×7 radio base station couples to the second 3×7 radio base station to create the 3×15 radio base station utilizing 14 radios and an extra control radio for voice or data communication and one control radio for control signals, the 3×15 radio base station providing the three sectors with fifteen radios per each sector, the 3×15 radio base station transmitting and receiving frequencies in at least one range of 806–960 MHz, 1710–1855 MHz, 2500–2690 MHz, and 2.4 GHz–2.5 GHz.

* * * * *